US012811049B2

(12) United States Patent
Seko

(10) Patent No.: US 12,811,049 B2
(45) Date of Patent: Nov. 24, 2026

(54) INDUCTOR COMPONENT

(71) Applicant: Murata Manufacturing Co., Ltd., Kyoto-fu (JP)

(72) Inventor: Atsushi Seko, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 605 days.

(21) Appl. No.: 18/488,565

(22) Filed: Oct. 17, 2023

(65) Prior Publication Data

US 2024/0153692 A1 May 9, 2024

(30) Foreign Application Priority Data

Nov. 4, 2022 (JP) ................................ 2022-177245

(51) Int. Cl.
*H01F 27/28* (2006.01)
*H01F 27/00* (2006.01)

(52) U.S. Cl.
CPC ....... *H01F 27/006* (2013.01); *H01F 27/2823* (2013.01)

(58) Field of Classification Search
CPC ...... H01F 27/006; H01F 27/2823; H01F 5/04; H01F 41/043; H01F 17/0013; H01F 27/292; H01F 27/28; H01F 27/29; H01F 27/34
USPC ............ 336/65, 83, 192, 200, 206–208, 232
See application file for complete search history.

(56) References Cited

U.S. PATENT DOCUMENTS

| | | | | |
|---|---|---|---|---|
| 2018/0012700 | A1 | 1/2018 | Lee et al. | |
| 2018/0090266 | A1* | 3/2018 | Sano | H01F 27/292 |
| 2018/0197674 | A1* | 7/2018 | Yoshinaka | H01F 27/2885 |
| 2019/0333689 | A1* | 10/2019 | Park | H01F 27/32 |
| 2022/0270803 | A1* | 8/2022 | Takahashi | H01F 17/0013 |

FOREIGN PATENT DOCUMENTS

| | | | |
|---|---|---|---|
| JP | 2010-165975 | A | 7/2010 |
| JP | 5459327 | B2 | 4/2014 |
| JP | 2019-153798 | A | 9/2019 |
| JP | 6787286 | B2 | 11/2020 |

* cited by examiner

*Primary Examiner* — Tuyen T Nguyen
(74) *Attorney, Agent, or Firm* — Studebaker Brackett PLLC

(57) ABSTRACT

An inductor component includes an element assembly, a coil that is within the element assembly and is spirally wound in the coil axis direction, a first outer electrode electrically connected to one end of the coil, and a second outer electrode electrically connected to the other end of the coil. The element assembly includes an insulator, and a face of the element assembly includes a bottom face parallel to a coil axis direction, and a top face opposed to the bottom face in a height direction T orthogonal to the coil axis direction. The first and second outer electrodes each are exposed to at least the bottom face of the element assembly. The coil is formed by electrically interconnecting a plurality of coil wires laminated in the coil axis direction.

14 Claims, 3 Drawing Sheets

INDUCTOR COMPONENT

CROSS-REFERENCE TO RELATED APPLICATION

This application claims benefit of priority to Japanese Patent Application No. 2022-177245, filed Nov. 4, 2022, the entire content of which is incorporated herein by reference.

BACKGROUND

Technical Field

The present disclosure relates to an inductor component.

Background Art

Japanese Patent No. 5459327 discloses an electronic component including a multilayer body, and a spiral coil provided in the multilayer body, the coil composed of a plurality of coil conductor layers overlapping each other to form an annular trajectory in a plane view from a stacking direction, and a plurality of via hole conductors that connect the plurality of coil conductor layers to each other. The annular trajectory has a plurality of first corners protruding toward the outer side portion and second corners protruding toward the inner side portion, and all of the via hole conductors are provided at the respective first corners.

Japanese Patent No. 6787286 discloses a method of manufacturing an producing inductor component, the method comprising steps of preparing a photosensitive insulating paste including a filler material made of quartz, a glass material, and a resin material, and a conductive paste; applying the insulating paste to form a first insulating layer; exposing the first insulating layer with a first portion of the first insulating layer shielded by a mask from light; removing the first portion of the first insulating layer to form a groove having its larger depth than its width at a position corresponding to the first portion; applying the conductive paste into the groove to form a coil conductor layer in the groove; and applying the insulating paste onto the first insulating layer and onto the coil conductor layer to form a second insulating layer.

Japanese Unexamined Patent Application Publication No. 2019-153798 discloses an inductor including a body formed by laminating a plurality of insulating layers where coil patterns are disposed, and a first and second outer electrodes disposed outside of the above-described body. The plurality of coil patterns are interconnected via a coil connecting portion, and form a coil having both ends connected to the first and second outer electrodes via a coil extended portion. The plurality of coil patterns are constituted of coil pattern disposed on the outermost side and coil patterns disposed on the inner inside of the coil pattern placed on the outermost side, and the thickness of each of the coil patterns disposed on the inner side is larger than the thickness of the coil pattern disposed on the outermost side. The inductor further includes dummy electrodes formed at positions corresponding to the first and second outer electrodes in the plurality of insulating layers.

SUMMARY

In FIGS. 2 and 6 of Japanese Patent No. 5459327 and FIG. 1 of Japanese Patent No. 6787286, the coil conductor layers are shaped such that the coil conductor layer on the side of the top face is longer than the coil conductor layer on the side of the mounting face, and these coil conductor layers on the side of the top face and the mounting face are interconnected via a linear or curved coil conductor layer.

However, after investigation, the present inventors found that: as described in Japanese Patent Nos. 5459327 and 6787286, when it was attempted to make the coil conductor layer on the side of the top face longer than the coil conductor layer on the side of the mounting face and to interconnect these coil conductor layers on the side of the top face and the mounting face via the linear or curved coil conductor layer, the coil conductor layer on the side of the top face must be connected to the linear or curved coil conductor layers at any acute angle or right angle with a small curvature radius. Then, when the present inventors found that: when the coil conductor layers were formed by the method described in Japanese Patent Nos. 5459327 and 6787286, that is, photolithography using the photosensitive conductive paste so as to connect the coil conductor layer on the side of the top face to the linear or curved coil conductor layer at any acute angle or right angle and with a small curvature radius, the development during the process of forming the connecting portion between the coil conductor layer on the side of the top face and the linear or curved coil conductor layer caused developing residues (here, residues of conductive paste) due to insufficient circulation of the developing solution as well as excessive development due to insufficient circulation of rinsing solution for washing away developing solution, thereby leading to variations in width of the above-described connecting portion. As described above, after investigation, the present inventors found the difficulty in reducing variations of inductance in the electronic component described in Japanese Patent No. 5459327 and the inductor component described in Patent No. Japanese 6787286, because of the variations in width of the connecting portion between the coil conductor layer on the side of the top face and the linear or curved coil conductor layer.

To avoid the above-mentioned problems, it can be contemplated the coil conductor layers are shaped such that the coil conductor layers on the side of the top face and the mounting face have the almost equal lengths and these coil conductor layer on the side of the top face and the mounting face are interconnected via the arcuate coil conductor layer, as illustrated in FIGS. 1 and 2 of Japanese Unexamined Patent Application Publication No. 2019-153798. More specifically, when it is attempted to make the lengths of the coil conductor layers on the side of the top face and the mounting face substantially equal and to interconnect these coil conductor layer on the side of the top face and the mounting face with the arcuate coil conductor layer as in Japanese Unexamined Patent Application Publication No. 2019-153798, the coil conductor layer on the side of the top face can be connected to the coil conductor layer on the side of the mounting face with the arcuate coil conductor layers at any obtuse angle and with a large curvature radius. Therefore, in the development during the process of forming the connecting portion between the coil conductors layer on the side of the top face and the mounting face with the arcuate coil conductor layers, insufficient circulation of the developing solution and the rinsing solution could be resolved.

However, after investigation, the present inventors found that, when it is attempted to make the lengths of the coil conductor layers on the side of the top face and the mounting face substantially equal and connect these coil conductor layer on the side of the top face and the mounting face to each other with the arcuate coil conductor layers as in Japanese Unexamined Patent Application Publication No.

2019-153798, the coil conductor layers must be disposed so as to keep away from the outer electrodes, resulting in large space between the coil conductor layers and the outer electrodes. As deduced from the present inventors' investigation, the inductor described in Japanese Unexamined Patent Application Publication No. 2019-153798 had the problem that the efficiency of acquiring inductance disadvantageously lowered due to the large space between the coil conductor layers and the outer electrodes.

Accordingly, the present disclosure provides an inductor component capable of improving the efficiency of acquiring inductance while suppressing variations in inductance.

An inductor component according to the present disclosure includes an element assembly, a coil that is provided within the element assembly and is spirally wound in the coil axis direction, a first outer electrode electrically connected to one end of the coil, and a second outer electrode electrically connected to the other end of the coil. The element assembly includes an insulator. The face of the element assembly includes a bottom face parallel to the coil axis direction, and a top face opposed to the bottom face in a height direction orthogonal to the coil axis direction. The first outer electrode and the second outer electrode each are exposed to at least the bottom face of the element assembly. The coil is formed by electrically interconnecting a plurality of coil wires laminated in the coil axis direction. At least one of the coil wires includes, in the direction in which the coil wire extends, a first coil wire portion, a second coil wire portion adjacent to the first coil wire portion, and a third coil wire portion adjacent to the second coil wire portion. The first coil wire portion extends from the side of the top face of the element assembly toward the bottom face. When viewed in the coil axis direction, the inner periphery of the first coil wire portion is configured of a first inner arc. The first inner arc has a center position inside of the inner periphery of the coil wire and has at least one curvature radius. When viewed in the coil axis direction, the outer periphery of the first coil wire portion is configured of a first outer arc located closer to the face of the element assembly than the first inner arc. The first outer arc has a center position inside of the inner periphery of the coil wire and has at least one curvature radius. The second coil wire portion extends to be located closer to the bottom face of the element assembly than the first coil wire portion. When viewed in the coil axis direction, the inner periphery of the second coil wire portion is configured of a second outer arc. The second outer arc has a center position outside of the outer periphery of the coil wire and has at least one curvature radius. When viewed in the coil axis direction, the outer periphery of the second coil wire portion is configured of a second inner arc located closer to the face of the element assembly than the second outer arc. The second inner arc has a center position outside of the outer periphery of the coil wire and has at least one curvature radius. The third coil wire portion protrudes from the second coil wire portion toward the bottom face of the element assembly.

In the inductor component of the present disclosure, "inside of the inner periphery of the coil wire" means the position other than the position of the coil wire when viewed in the coil axis direction, where a shortest distance from the inner periphery of the coil wire is smaller than a shortest distance from the outer periphery of the coil wire.

In the inductor component of the present disclosure, "outside of the outer periphery of the coil wire" means the position other than the position of the coil wire when viewed in the coil axis direction, where a shortest distance from the outer periphery of the coil wire is smaller than a shortest distance from the inner periphery of the coil wire.

The present disclosure can provide an inductor component capable of improving the efficiency of acquiring inductance while suppressing variations in inductance.

DETAILED DESCRIPTION

Figure 1:
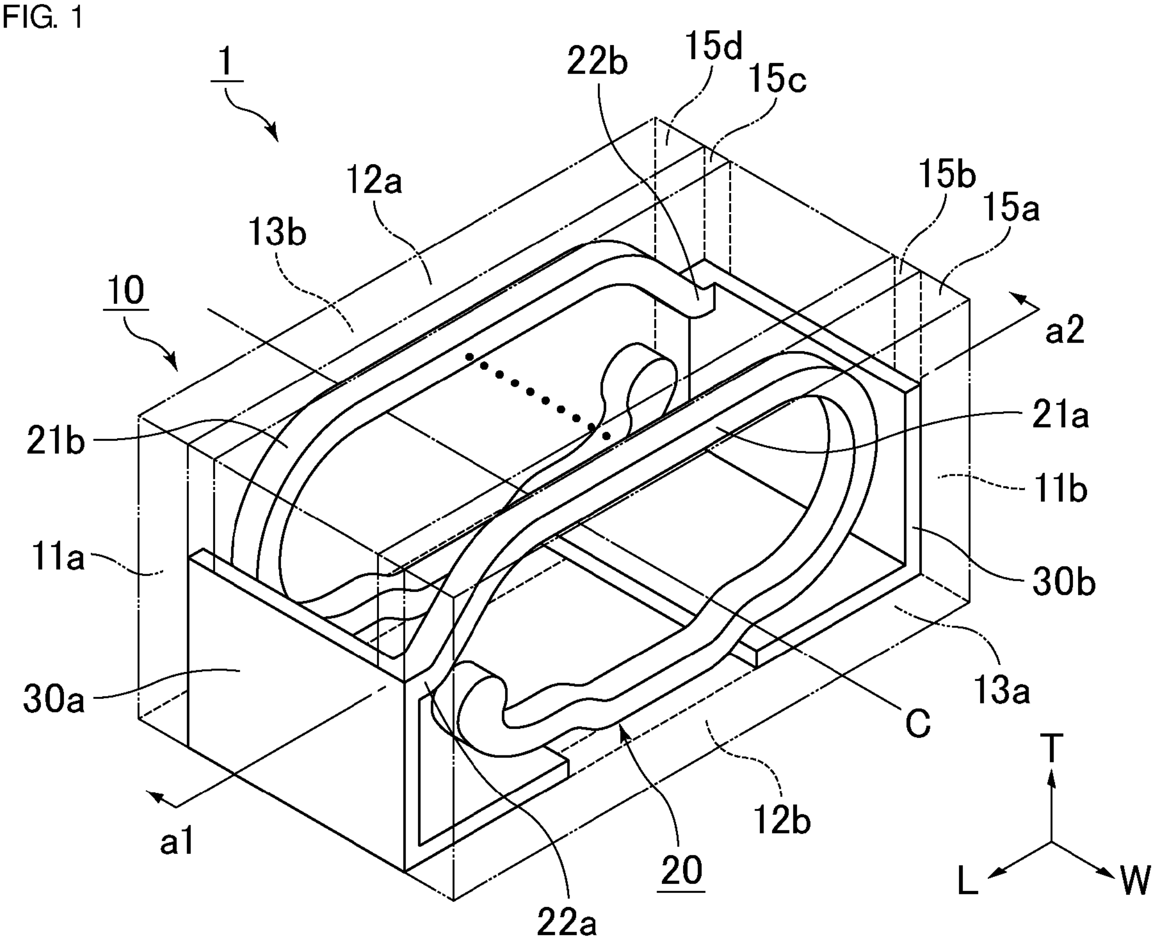
FIG. 1 is a schematic perspective view illustrating an example of an inductor component according to the present disclosure.

An inductor component according to the present disclosure will be described below. It is noted that the present disclosure is not limited to a below-mentioned configuration, and may be appropriately modified so as not to deviate from the subject matter of the present disclosure. Any combinations of discrete preferred configurations described below belongs to the present disclosure.

Following figures are schematic views, and may be different from actual products in terms of dimension, aspect ratio, and the like.

In this specification, terms denoting the relationship between elements (for example, "parallel", "perpendicular", "orthogonal", etc.) and terms denoting the shape of the elements means literal exact aspects as well as substantially equivalent scope including a difference of about a few percent.

An inductor component according to the present disclosure includes an element assembly, a coil that is provided within the element assembly and is spirally wound in the coil axis direction, a first outer electrode electrically connected to one end of the coil, and a second outer electrode electrically connected to the other end of the coil. The element assembly includes an insulator. The face of the element assembly includes a bottom face parallel to the coil axis direction, and a top face opposed to the bottom face in a height direction orthogonal to the coil axis direction. The first outer electrode and the second outer electrode each are exposed to at least the bottom face of the element assembly. The coil is formed by electrically interconnecting a plurality of coil wires laminated in the coil axis direction. At least one of the coil wires includes, in the direction in which the coil wire extends, a first coil wire portion, a second coil wire portion adjacent to the first coil wire portion, and a third coil wire portion adjacent to the second coil wire portion. The first coil wire portion extends from the side of the top face of the element assembly toward the bottom face. When viewed in the coil axis direction, the inner periphery of the first coil wire portion is configured of a first inner arc. The first inner arc has a center position inside of the inner periphery of the coil wire and has at least one curvature radius. When viewed in the coil axis direction, the outer periphery of the first coil wire portion is configured of a first outer arc located closer to the face of the element assembly than the first inner arc. The first outer arc has a center position inside of the inner periphery of the coil wire and has at least one curvature radius. The second coil wire portion extends to be located closer to the bottom face of the element assembly than the first coil wire portion. When viewed in the coil axis direction, the inner periphery of the second coil wire portion is configured of a second outer arc. The second outer arc has a center position outside of the outer periphery of the coil wire and has at least one curvature radius. When viewed in the coil axis direction, the outer periphery of the second coil wire portion is configured of a second inner arc located closer to the face of the element assembly than the second outer arc. The second inner arc has a center position outside of the outer periphery of the coil wire and has at least one curvature radius. The third coil wire portion protrudes from the second coil wire portion toward the bottom face of the element assembly.

FIG. 1 is a schematic perspective view illustrating an example of the inductor component according to the present disclosure.

An inductor component 1 illustrated in FIG. 1 has an element assembly 10, a coil 20, a first outer electrode 30*a*, and a second outer electrode 30*b*.

In this specification, as illustrated in FIG. 1 and other figures, length direction, height direction, and width direction are represented in L, T, and W, respectively. Here, the length direction L, the height direction T, and the width direction W are orthogonal to each other.

As illustrated in FIG. 1, faces of the element assembly 10 include an end face 11*a* and end face 11*b* that are opposed to each other in the length direction L, top face 12*a* and a bottom face 12*b* that are opposed to each other in the height direction T, and a side face 13*a* and a side face 13*b* that are opposed to each other in the width direction W. In the example illustrated in FIG. 1, the width direction W is parallel to a coil axis direction of the coil 20. That is, a face of the element assembly 10 includes the bottom face 12*b* that is parallel to the coil axis direction, and the top face 12*a* that is opposed to the bottom face 12*b* in the height direction T orthogonal to the coil axis direction.

Hereinafter, unless otherwise noted, the coil axis direction is parallel to the width direction W.

The bottom face 12*b* of the element assembly 10 is a mounting face. More specifically, the bottom face 12*b* of the element assembly 10 is a mounting face opposed to an object to be mounted (for example, substrate) at mounting of the inductor component 1. Thus, in the inductor component 1, the mounting face of the element assembly 10, that is, the bottom face 12*b* of the element assembly 10 is parallel to the coil axis direction.

At least one of the faces of the element assembly 10, that is, at least one of the end face 11*a*, the end face 11*b*, the top face 12*a*, the bottom face 12*b*, the side face 13*a*, and the side face 13*b* may be provided with marking for easily recognition of each of the faces.

The end face 11*a* and the end face 11*b* of the element assembly 10 are not necessarily strictly orthogonal to the length direction L. Additionally, the top face 12*a* and the bottom face 12*b* of the element assembly 10 are not necessarily strictly orthogonal to the height direction T. Further, the side face 13*a* and the side face 13*b* of the element assembly 10 are not necessarily strictly orthogonal to the width direction W.

As illustrated in FIG. 1, the element assembly 10 is, for example, shaped like a rectangular parallelepiped.

In this specification, the rectangular parallelepiped only need to be a substantially rectangular parallelepiped, and includes, for example, a rectangular parallelepiped having round corners and ridges as described below.

The element assembly 10 preferably has round corners and ridges. The corners of the element assembly 10 are portions where three faces of the element assembly 10 cross each other. The ridges of the element assembly 10 are portions where two faces of the element assembly 10 cross each other.

The element assembly 10 includes an insulator. In the example illustrated in FIG. 1, the insulator is formed by laminating a plurality of insulating layers in the coil axis direction.

In the example illustrated in FIG. 1, the plurality of insulating layers include an insulating layer 15*a*, an insulating layer 15*b*, an insulating layer 15*c*, and an insulating layer 15*d*.

It is noted that, though not illustrated in FIG. 1, at least one insulating layer is present between the insulating layer 15*b* and the insulating layer 15*c* in the coil axis direction.

It is noted that, for convenience of description, FIG. 1 illustrates boundaries between the plurality of insulating layers, but in fact, such boundaries do not clearly appear.

Examples of insulating materials constituting the insulator (insulating layers) include glass materials containing borosilicate glass as a main ingredient, ceramics materials, epoxy resins, fluororesins, organic materials such as polymeric resins, and composite materials such as glass epoxy resins. Materials having small permittivity and dielectric loss are preferable as the insulating materials.

The insulating materials constituting the plurality of insulating layers may be the same or different or partially different.

The dimensions of the plurality of insulating layers in the coil axis direction may be the same or different or partially different.

As illustrated in FIG. 1, the coil 20 is provided in the element assembly 10, and is spirally wound in a coil axis direction.

The coil axis direction of the coil 20 is the direction in which a coil axis C of the coil 20 extends, and is parallel to the bottom face 12*b*, which is the mounting face of the element assembly 10 as described above.

As illustrated in FIG. 1, the coil 20 is formed by electrically connecting a plurality of coil wires laminated in the coil axis direction.

In the example illustrated in FIG. 1, the plurality of coil wires include a first coil wire 21*a* and a second coil wire 21*b*.

Among the plurality of coil wires, the first coil wire 21*a* is located at the outermost position on the side of the side face 13*a* of the element assembly 10 in the coil axis direction.

The first coil wire 21*a* may have a single-layered structure, or may have a multilayered structure.

Among the plurality of coil wires, the second coil wire 21*b* is located at the outermost position on the side of the side face 13*b* of the element assembly 10 in the coil axis direction.

The second coil wire 21*b* may have a single-layered structure, or may have a multilayered structure.

It is noted that, though not illustrated in FIG. 1, at least one coil wire is present between the first coil wire 21*a* and the second coil wire 21*b* in the coil axis direction.

Examples of conductive materials constituting the coil wires include Ag, Au, Cu, Pd, Ni, Al, and metal alloys containing at least one of these metals.

Conductive materials constituting the plurality of coil wires may be the same or different or partially different.

Dimensions of the plurality of coil wires in the coil axis direction may be the same or different or partially different.

Dimensions of the plurality of coil wires in the direction orthogonal to the direction in which the coil wires extend when viewed in the coil axis direction, that is, the widths when viewed in the coil axis direction may be the same or different or partially different. Among the plurality of coil wires, adjacent coil wires in the coil axis direction may be electrically connected to each other via a connecting conductor passing through the insulating layer between the adjacent coil wires in the coil axis direction. That is, the coil 20 may be formed by electrically connecting the plurality of coil wires laminated in the coil axis direction via the connecting conductor.

The connecting conductor may have a single-layered structure, or may have a multilayered structure.

Examples of conductive materials constituting the connecting conductor include Ag, Au, Cu, Pd, Ni, Al, and metal alloys containing at least one of these metals.

It is noted that, as described above, in the example illustrated in FIG. 1, the coil 20 is composed of three or larger coil wires including the first coil wire 21*a*, the second coil wire 21*b*, and at least one added coil wire. However, the coil 20 can be composed of only the first coil wire 21*a* and the second coil wire 21*b* by adjusting the position of the connecting conductor.

As illustrated in FIG. 1, the first outer electrode 30*a* is electrically connected to one end of the coil 20. More specifically, as illustrated in FIG. 1, the first coil wire 21*a* constituting the coil 20 is electrically connected to the first outer electrode 30*a* via a first extended wire 22*a*.

The first extended wire 22*a* may have a single-layered structure, or may have a multilayered structure.

As illustrated in FIG. 1, the second outer electrode 30*b* is electrically connected to the other end of the coil 20. More specifically, as illustrated in FIG. 1, the second coil wire 21*b* constituting the coil 20 is electrically connected to the second outer electrode 30*b* via a second extended wire 22*b*.

The second extended wire 22*b* may have a single-layered structure, or may have a multilayered structure.

Examples of conductive materials constituting the extended wires include Ag, Au, Cu, Pd, Ni, Al, and metal alloys containing at least one of these metals.

Conductive materials constituting the first extended wire 22*a* and the second extended wire 22*b* may be the same or different.

In this specification, when viewed in the coil axis direction, in the path where the coil wire is connected to the outer electrode, the wire extending toward the outer electrode while being inclined relative to a linear portion of the coil wire is defined as the extended wire (for example, the example illustrated in FIG. 1). In this case, when viewed in the coil axis direction, the coil wire and the extended wire are not present on the same straight line across the boundary therebetween. It is noted that, when viewed in the coil axis direction, in the case where no extended wire corresponding to the extended wire defined above is found, a wire that does not overlap the coil when viewed in the coil axis direction (protrudes the coil) is defined as the extended wire (for example, the different example from that in FIG. 1).

As illustrated in FIG. 1, the first outer electrode 30*a* is exposed to at least the bottom face 12*b* of the element assembly 10.

In the example illustrated in FIG. 1, first outer electrode 30*a* extends from a portion of the bottom face 12*b* of the element assembly 10 to a portion of the end face 11*a*. That is, in the example illustrated in FIG. 1, the first outer electrode 30*a* is also exposed to the portion of the end face 11*a* of the element assembly 10 in addition to the bottom face 12*b* of the element assembly 10.

It is noted that the first outer electrode 30*a* may be exposed to only the bottom face 12*b* of the element assembly 10.

As illustrated in FIG. 1, the second outer electrode 30*b* is exposed to at least the bottom face 12*b* of the element assembly 10.

In the example illustrated in FIG. 1, the second outer electrode 30*b* extends from a portion of the bottom face 12*b* of the element assembly 10 to a portion of the end face 11*b*. That is, in the example illustrated in FIG. 1, the second outer electrode 30*b* is also exposed to the portion of the end face 11*b* of the element assembly 10 in addition to the bottom face 12*b* of the element assembly 10.

It is noted that the second outer electrode 30*b* may be exposed to only the bottom face 12*b* of the element assembly 10.

As described above, the first outer electrode 30*a* and the second outer electrode 30*b* are provided so as to be away from each other in the direction orthogonal to the coil axis direction (here, the length direction L).

Further, when each of the first outer electrode 30*a* and the second outer electrode 30*b* is exposed to the bottom face 12*b* of the element assembly 10, which is the mounting face, the mountability of the inductor component 1 is readily improved.

In the example illustrated in FIG. 1, a dimension of the first outer electrode 30*a* in the coil axis direction is smaller than a dimension of the element assembly 10 in the coil axis direction.

It is noted that the dimension of the first outer electrode 30*a* in the coil axis direction may be the same as the dimension of the element assembly 10 in the coil axis direction.

In the example illustrated in FIG. 1, a dimension of the second outer electrode 30*b* in the coil axis direction is smaller than the dimension of the element assembly 10 in the coil axis direction.

It is noted that the dimension of the second outer electrode 30*b* in the coil axis direction may be the same as the dimension of the element assembly 10 in the coil axis direction.

The first outer electrode 30*a* may have a single-layered structure, or may have a multilayered structure.

The second outer electrode 30*b* may have a single-layered structure, or may have a multilayered structure.

Examples of conductive materials constituting the outer electrodes include Ag, Au, Cu, Pd, Ni, Al, and metal alloys containing at least one of these metals.

The first outer electrode 30*a* may have a base electrode containing the above-described conductive material (for example, Ag), a Ni-plated electrode, and an Sn-plated electrode, in the order from the side of the coil 20. In this case, in the first outer electrode 30*a*, the base electrode may form a face integrated with the faces of the element assembly 10 (in FIG. 1, the end face 11*a* and the bottom face 12*b* of the element assembly 10), and rise from the faces of the element assembly 10 (in FIG. 1, the end face 11*a* and the bottom face 12*b* of the element assembly 10) such that the Ni-plated electrode and the Sn-plated electrode cover the base electrode.

The second outer electrode 30*b* may have a base electrode containing the above-described conductive material (for example, Ag), a Ni-plated electrode, and an Sn-plated electrode, in the order from the side of the coil 20. In this case, in the second outer electrode 30*b*, the base electrode may form a face integrated with the faces of the element assembly 10 (in FIG. 1, the end face 11*b* and the bottom face 12*b* of the element assembly 10), and rise from the faces of the element assembly 10 (in FIG. 1, the end face 11*b* and the bottom face 12*b* of the element assembly 10) such that the Ni-plated electrode and the Sn-plated electrode cover the base electrode.

The conductive materials constituting the first outer electrode 30*a* and the second outer electrode 30*b* may be the same or different.

Figure 2:
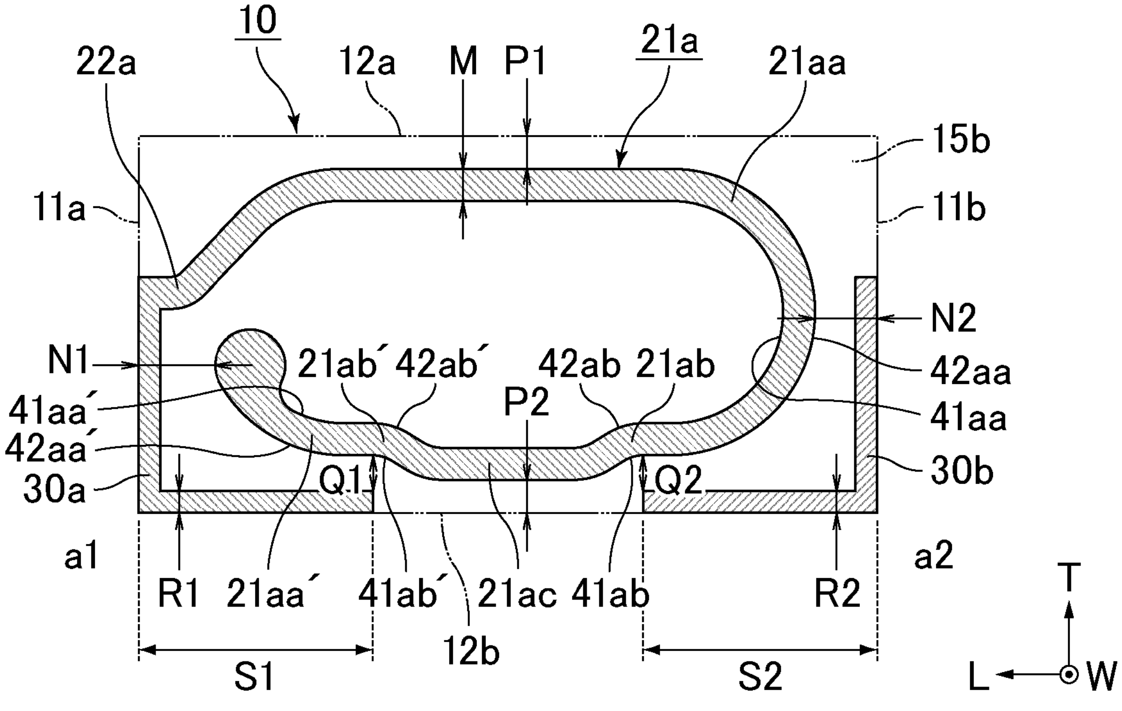
FIG. 2 is a schematic sectional view illustrating an example of a cross section along a line segment a1-a2 of the inductor component illustrated in FIG. 1.

FIG. 2 is a schematic sectional view illustrating an example of a cross-section along a line segment a1-a2 of the inductor component illustrated in FIG. 1. More specifically, FIG. 2 illustrates a cross-section including the first coil wire 21*a* and the first extended wire 22*a* among cross-sections of the inductor component 1 in FIG. 1 along the length direction L and the height direction T.

Figure 3:
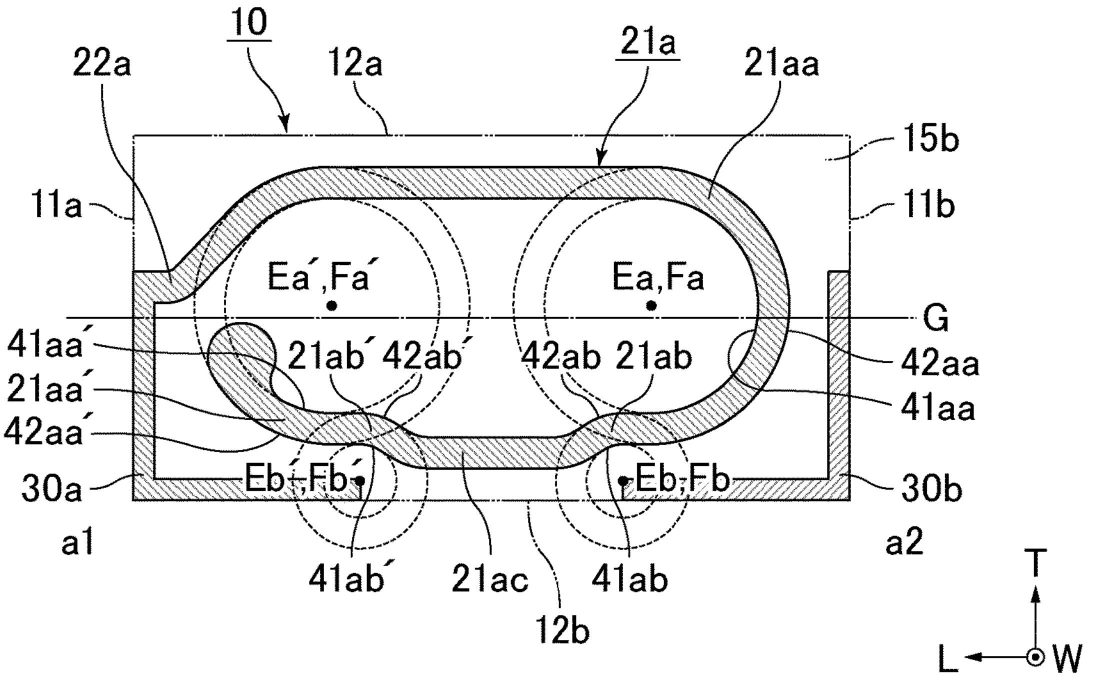
FIG. 3 is a schematic sectional view illustrating with an auxiliary line added to FIG. 2 for describing the shape of a first coil wire.

FIG. 3 is a schematic sectional view with an auxiliary line added to FIG. 2 for describing the shape of the first coil wire.

As illustrated in FIGS. 2 and 3, the first coil wire 21*a* includes a first coil wire portion 21*aa*, a second coil wire portion 21*ab* adjacent to the first coil wire portion 21*aa*, and a third coil wire portion 21*ac* adjacent to the second coil wire portion 21*ab*, in the direction in which the first coil wire 21*a* extends.

As illustrated in FIGS. 2 and 3, the first coil wire portion 21*aa* extends from the side of the top face 12*a* of the element assembly 10 toward the bottom face 12*b*.

As illustrated in FIGS. 2 and 3, when viewed in the coil axis direction, an inner periphery of the first coil wire portion 21*aa* is configured of a first inner arc 41*aa*.

The first inner arc 41*aa* has a center position inside of an inner periphery of the first coil wire 21*a*, and has at least one curvature radius.

In the example illustrated in FIGS. 2 and 3, the first inner arc 41*aa* has a center position Ea inside of the inner periphery of the first coil wire 21*a*, and has one curvature radius.

In the case where the first inner arc 41*aa* has a plurality of curvature radiuses, the first inner arc 41*aa* includes a plurality of arcs corresponding to the curvature radiuses, and all of the center positions of the plurality of arcs only need to be located inside of the inner periphery of the first coil wire 21*a*.

In this specification, "inside of the inner periphery of the coil wire" means the position other than the position of the coil wire when viewed in the coil axis direction, where a shortest distance from the inner periphery of the coil wire is smaller than a shortest distance from the outer periphery of the coil wire.

In the case where the first inner arc 41*aa* has a plurality of curvature radiuses, the first inner arc 41*aa* includes a plurality of arcs having respective curvature radiuses. These arcs may be interconnected via a line segment (including tangent line), may be directly interconnected without a line segment therebetween, or may be interconnected via a line segment in some regions and directly interconnected without a line segment therebetween in the other regions.

As illustrated in FIGS. 2 and 3, when viewed in the coil axis direction, the outer periphery of the first coil wire portion 21*aa* is configured of a first outer arc 42*aa* located closer to the face of the element assembly 10 than the first inner arc 41*aa*.

The first outer arc 42*aa* has a center position inside of the inner periphery of the first coil wire 21*a*, and has at least one curvature radius.

In the example illustrated in FIGS. 2 and 3, the first outer arc 42*aa* has a center position Fa inside of the inner periphery of the first coil wire 21*a*, and has one curvature radius.

In the example illustrated in FIGS. 2 and 3, the center position Ea of the first inner arc 41*aa* is the same as the center position Fa of the first outer arc 42*aa*.

It is noted that the center position Ea of the first inner arc 41*aa* may be different from the center position Fa of the first outer arc 42*aa*.

In the case where the first outer arc 42*aa* has a plurality of curvature radiuses, the first outer arc 42*aa* includes a plurality of arcs corresponding to the curvature radiuses, and all of the center positions of the plurality of arcs only need to be located inside of the inner periphery of the first coil wire 21*a*.

In the case where the first outer arc 42*aa* has a plurality of curvature radiuses, the first outer arc 42*aa* includes a plurality of arcs having respective curvature radiuses. These arcs may be interconnected via a line segment (including tangent line), may be directly interconnected without a line segment therebetween, or may be interconnected via a line segment in some regions and directly interconnected without a line segment therebetween in the other regions.

Since the first coil wire portion 21*aa* extending from the side of the top face 12*a* of the element assembly 10 toward the bottom face 12*b* is shaped in the first coil wire 21*a* as described above, in the development during the process of forming the connecting portion between the coil wire portion on the side of the top face 12*a* of the element assembly 10 and the first coil wire portion 21*aa*, and the connecting portion between the coil wire portion on the side of the bottom face 12*b* of the element assembly 10 and the first coil wire portion 21*aa*, developing solution and rinsing solution are easily circulated, hardly causing developing residues and excessive development. Therefore, in the inductor component 1, variations in width of the connecting portion of the first coil wire 21*a* when viewed in the coil axis direction are suppressed, thereby suppressing variations in inductance. Additionally, since variations in inductance in the inductor component 1 are suppressed, enhancing yields indicating the ratio of acquiring an inductor component having normal inductance.

As illustrated in FIGS. 2 and 3, the second coil wire portion 21*ab* extends to be located closer to the bottom face 12*b* of the element assembly 10 than the first coil wire portion 21*aa*.

As illustrated in FIGS. 2 and 3, when viewed in the coil axis direction, the inner periphery of the second coil wire portion 21*ab* is configured of a second outer arc 42*ab*.

The second outer arc 42*ab* has a center position outside of the outer periphery of the first coil wire 21*a*, and has at least one curvature radius.

In the example illustrated in FIGS. 2 and 3, the second outer arc 42*ab* has a center position Fb outside of the outer periphery of the first coil wire 21*a*, and has one curvature radius.

In the example illustrated in FIGS. 2 and 3, the center position Fb of the second outer arc 42*ab* is located outside of the outer periphery of the first coil wire 21*a* and within the element assembly 10.

It is noted that the center position Fb of the second outer arc 42*ab* may be located outside of the element assembly 10.

In the case where the second outer arc 42*ab* has a plurality of curvature radius, the second outer arc 42*ab* includes a plurality of arcs having respective curvature radiuses and however, all of the center positions of these arcs only need to be located outside of the outer periphery of the first coil wire 21*a*.

In this specification, "outside of the outer periphery of the coil wire" means the position other than the position of the coil wire when viewed in the coil axis direction, where a shortest distance from the outer periphery of the coil wire is smaller than a shortest distance from the inner periphery of the coil wire.

In the case where the second outer arc 42*ab* has a plurality of curvature radiuses, the second outer arc 42*ab* includes a plurality of arcs having respective curvature radiuses. These arcs may be interconnected via a line segment (including tangent line), may be directly interconnected without a line segment therebetween, or may be interconnected via a line segment in some regions and directly interconnected without a line segment therebetween in the other regions.

As illustrated in FIGS. 2 and 3, when viewed in the coil axis direction, the outer periphery of the second coil wire portion 21*ab* is configured of a second inner arc 41*ab* located closer to the face of the element assembly 10 than the second outer arc 42*ab*.

The second inner arc 41*ab* has a center position outside of the outer periphery of the first coil wire 21*a*, and has at least one curvature radius.

In the example illustrated in FIGS. 2 and 3, the second inner arc 41*ab* has a center position Eb outside of the outer periphery of the first coil wire 21*a*, and has one curvature radius.

In the example illustrated in FIGS. 2 and 3, the center position Eb of the second inner arc 41*ab* is located outside of the outer periphery of the first coil wire 21*a* and within the element assembly 10.

It is noted that the center position Eb of the second inner arc 41*ab* may be located outside of the element assembly 10.

In the example illustrated in FIGS. 2 and 3, the center position Eb of the second inner arc 41*ab* is the same as the center position Fb of the second outer arc 42*ab*.

It is noted that the center position Eb of the second inner arc 41*ab* may be different from the center position Fb of the second outer arc 42*ab*.

In the case where the second inner arc 41*ab* has a plurality of curvature radius, the second inner arc 41*ab* includes a plurality of arcs having respective curvature radiuses and however, all of the center positions of these arcs only need to be located outside of the outer periphery of the first coil wire 21*a*.

In the case where the second inner arc 41*ab* has a plurality of curvature radiuses, the second inner arc 41*ab* includes a plurality of arcs having respective curvature radiuses. These arcs may be interconnected via a line segment (including tangent line), may be directly interconnected without a line segment therebetween, or may be interconnected via a line segment in some regions and directly interconnected without a line segment therebetween in the other regions.

As described above, as illustrated in FIGS. 2 and 3, the inner periphery of the first coil wire 21*a* includes the first inner arc 41*aa* and the second outer arc 42*ab* adjacent to the first inner arc 41*aa* on the side of the bottom face 12*b* of the element assembly 10. Further, as illustrated in FIGS. 2 and 3, the outer periphery of the first coil wire 21*a* includes the first outer arc 42*aa* and the second inner arc 41*ab* adjacent to the first outer arc 42*aa* on the side of the bottom face 12*b* of the element assembly 10.

The inner periphery and the outer periphery of the first coil wire 21*a* have the above-described shape to suppress reflections of high-frequency signals.

As illustrated in FIGS. 2 and 3, the third coil wire portion 21*ac* protrudes from the second coil wire portion 21*ab* toward the bottom face 12*b* of the element assembly 10. More specifically, the third coil wire portion 21*ac* protrudes from the second coil wire portion 21*ab* toward the bottom face 12*b* of the element assembly 10, in particular, toward a section between the first outer electrode 30*a* and the second outer electrode 30*b*, which each are exposed to the bottom face 12*b* of the element assembly 10.

Since the third coil wire portion 21*ac* protrudes from the second coil wire portion 21*ab* toward the bottom face 12*b* of the element assembly 10, the inner diameter of the first coil wire 21*a* becomes large, reducing the space between the first coil wire 21*a* and the first outer electrode 30*a* and the space between the first coil wire 21*a* and the second outer electrode 30*b*. Therefore, the inductor component 1 has enhanced efficiency of acquiring inductance.

Thus, the inductor component 1 can enhance the efficiency of acquiring inductance while suppressing variations in inductance.

The inductor component 1 can improve the efficiency of acquiring inductance while suppressing variations in inductance, and in addition, further adjust the inductance by adjusting parameters such as the width of the coil wire when viewed in the coil axis direction, the shortest distance between the end face 11*a* of the element assembly 10 and the coil 20 in the length direction L, the shortest distance between the end face 11*b* of the element assembly 10 and the coil 20 in the length direction L, the number of turns of the coil 20, the dimension of the coil wires in the coil axis direction, and the dimension of the insulating layer between adjacent coil wires in the coil axis direction.

As illustrated in FIG. 3, the curvature radius of the first inner arc 41*aa* is preferably larger than the curvature radius of the second inner arc 41*ab*.

Since the curvature radius of the first inner arc 41*aa* is larger than the curvature radius of the second inner arc 41*ab*, the curvature radius of the first coil wire portion 21*aa* that is present in a dead-end region surrounded with the coil wire portion of the element assembly 10 on the side of the top face 12*a* and the coil wire portion of the element assembly 10 on the side of the bottom face 12*b* becomes large. For this reason, in the development during the process of forming the first coil wire portion 21*aa*, developing solution and rinsing solution are circulated more easily, such that developing residues and excessive development hardly occur. Therefore, in the inductor component 1 of the above-described aspect, variations in width when viewed in the coil axis direction of the first coil wire 21*a* are further suppressed, thereby further suppressing variations in inductance. In addition, in the inductor component 1 of the above-described aspect, since variations in inductance are further suppressed, yields indicating the ratio of acquiring an inductor component having normal inductance are further enhanced.

Since the second coil wire portion 21*ab*, as opposed to the first coil wire portion 21*aa*, is present in an opened region rather than a dead-end region for the circulation (flowing) of developing solution and rinsing solution, even when the curvature radius of the second inner arc 41*ab* is smaller than the curvature radius of the first inner arc 41*aa*, in the development during the process of forming the second coil wire portion 21*ab*, developing solution and rinsing solution hardly build up, such that developing residues and excessive development hardly occur.

In the case where both of the first inner arc 41*aa* and the second inner arc 41*ab* has a plurality of curvature radiuses, a minimum value of the curvature radius of the first inner arc 41*aa* is preferably larger than a maximum value of the curvature radius of the second inner arc 41*ab*.

Additionally, the curvature radius of the first inner arc 41*aa* may be equal to or smaller than the curvature radius of the second inner arc 41*ab*. That is, the curvature radius of the first inner arc 41*aa* may be the same as the curvature radius of the second inner arc 41*ab*, or may be less than the curvature radius of the second inner arc 41*ab*.

In the case where both of the first inner arc 41*aa* and the second inner arc 41*ab* have a plurality of curvature radius, a maximum value of the curvature radius of the first inner arc 41*aa* may be equal to or smaller than a minimum value of the curvature radius of the second inner arc 41*ab*. That is, the maximum value of the curvature radius of the first inner arc 41*aa* may be the same as the minimum value of the curvature radius of the second inner arc 41*ab*, or may be less than the minimum value of the curvature radius of the second inner arc 41*ab*.

The curvature radius of the arc constituting the periphery (the inner periphery or the outer periphery) of the coil wire portion is determined as a radius of a circle approximated from arbitrary three points on the periphery of a target coil wire portion. However, in selecting the three points on the periphery of the target coil wire portion, minute irregularities, deformations, and the like on the periphery of the coil wire portion should be avoided. Noted that in the case where the value of the curvature radius approximated by the above-described method is judged to include an approximate error caused by minute irregularities, deformations, and the like on the periphery of the coil wire portion, the value without the approximate error is determined as the curvature radius.

As illustrated in FIG. 3, both of the center position Ea of the first inner arc 41*aa* and the center position Fa of the first outer arc 42*aa* are preferably located closer to the top face 12*a* of the element assembly 10 than a center position G of the element assembly 10 in the height direction T.

Since both of the center position Ea of the first inner arc 41*aa* and the center position Fa of the first outer arc 42*aa* is located closer to the top face 12*a* of the element assembly 10 than the center position G in the height direction T of the element assembly 10, the curvature radius of the first coil wire portion 21*aa* may become larger. Thus, in the development during the process of forming the first coil wire portion 21*aa*, developing solution and rinsing solution are circulated more easily, thereby further suppressing the occurrence of developing residues and excessive development. Therefore, in the inductor component 1 of the above-described aspect, variations in width when viewed in the coil axis direction of the first coil wire 21*a* are further suppressed, thereby further suppressing variations in inductance. In addition, in the inductor component 1 of the above-described aspect, since variations in inductance are further suppressed, yields indicating the ratio of acquiring an inductor component having normal inductance are further enhanced.

Noted that in the case where both of the first inner arc 41*aa* and the first outer arc 42*aa* have a plurality of curvature radiuses, both of all center positions of the plurality of arcs constituting the first inner arc 41*aa* and all center positions of the plurality of arcs constituting the first outer arc 42*aa* are preferably present to be closer to the top face 12*a* of the element assembly 10 than the center position G of the element assembly 10 in the height direction T.

The curvature radius of the first inner arc 41*aa* is preferably equal to or larger than 15% of the dimension of the element assembly 10 in the height direction T.

Since the curvature radius of the first inner arc 41*aa* is equal to or larger than 15% of the dimension of the element assembly 10 in the height direction T, the curvature radius of the first coil wire portion 21*aa* may become larger. For this reason, in the development during the process of forming the first coil wire portion 21*aa*, developing solution and rinsing solution are circulated more easily, such that developing residues and excessive development hardly occur. Therefore, in the inductor component 1 of the above-described aspect, variations in width when viewed in the coil axis direction of the first coil wire 21*a* are further suppressed, thereby further suppressing variations in inductance. Additionally, in the inductor component 1 of the above-described aspect, since variations in inductance are further suppressed, yields indicating the ratio of acquiring an inductor component having normal inductance are further enhanced.

The curvature radius of the first inner arc 41*aa* is preferably equal to or smaller than 35% of the dimension of the element assembly 10 in the height direction T.

Since the curvature radius of the first inner arc 41*aa* is equal to or smaller than 35% of the dimension of the element assembly 10 in the height direction T, even if the first coil wire portion 21*aa* is made thin and further, an insulating region between the first coil wire portion 21*aa* and the face of the element assembly 10 is made small, the region where the first coil wire portion 21*aa* is disposed can be easily kept. That is, since the curvature radius of the first inner arc 41*aa* is equal to or smaller than 35% of the dimension of the element assembly 10 in the height direction T, in keeping the region where the first coil wire portion 21*aa* is disposed, it is possible to suppress an increase in resistance due to thinning of the first coil wire portion 21*aa*, and a decrease in reliability due to a small insulating region between the first coil wire portion 21*aa* and the face of the element assembly 10.

As described above, the curvature radius of the first inner arc 41*aa* is preferably equal to or larger than 15% and equal to or smaller than 35% (i.e., from 15% to 35%) of the dimension of the element assembly 10 in the height direction T.

Noted that in the case where the first inner arc 41*aa* has a plurality of curvature radiuses, the minimum value of the curvature radius of the first inner arc 41*aa* is preferably equal to or larger than 15% of the dimension of the element assembly 10 in the height direction T. Additionally, in the case where the first inner arc 41*aa* has a plurality of curvature radiuses, the maximum value of the curvature radius of the first inner arc 41*aa* is preferably equal to or smaller than 35% of the dimension of the element assembly 10 in the height direction T.

The curvature radius of the first inner arc 41*aa* is preferably equal to or larger than 30 μm. The above-mentioned scope of the curvature radius of the first inner arc 41*aa* is especially preferable when the region where the coil wires of the inductor component 1 are disposed is small, for example, when the inductor component 1 has a small size such as 0402 (0.4 mm×0.2 mm×0.2 mm).

Since the curvature radius of the first inner arc 41*aa* is equal to or larger than 30 μm, the curvature radius of the first coil wire portion 21*aa* may become larger. For this reason, in the development during the process of forming the first coil wire portion 21*aa*, developing solution and rinsing solution are circulated more easily, such that developing residues and excessive development hardly occur. Therefore, in the inductor component 1 of the above-described aspect, variations in width when viewed in the coil axis direction of the first coil wire 21*a* are further suppressed, thereby further suppressing variations in inductance. Additionally, in the inductor component 1 of the above-described aspect, since variations in inductance are further suppressed, yields indicating the ratio of acquiring an inductor component having normal inductance are further enhanced.

The curvature radius of the first inner arc 41*aa* is preferably equal to or smaller than 70 μm. The above-mentioned scope of the curvature radius of the first inner arc 41*aa* is especially preferable when the region where the coil wires of the inductor component 1 are disposed is small, for example, when the inductor component 1 has a small size such as 0402 (0.4 mm×0.2 mm×0.2 mm).

As described above, the curvature radius of the first inner arc 41*aa* is preferably equal to or larger than 30 μm and equal to or smaller than 70 μm (i.e., from 30 μm to 70 μm).

Noted that in the case where the first inner arc 41*aa* has a plurality of curvature radiuses, the minimum value of the curvature radius of the first inner arc 41*aa* is preferably equal to or larger than 30 μm. Additionally, in the case where the first inner arc 41*aa* has a plurality of curvature radiuses, the maximum value of the curvature radius of the first inner arc 41*aa* is preferably equal to or smaller than 70 μm.

The curvature radius of the first outer arc 42*aa* is preferably equal to or larger than 60 μm and equal to or smaller than 85 μm (i.e., from 60 μm to 85 μm). The above-mentioned scope of the curvature radius of the first outer arc 42*aa* is especially preferable when the region where the coil wires of the inductor component 1 are disposed is small, for example, when the inductor component 1 has a small size such as 0402 (0.4 mm×0.2 mm×0.2 mm).

Figure 4:
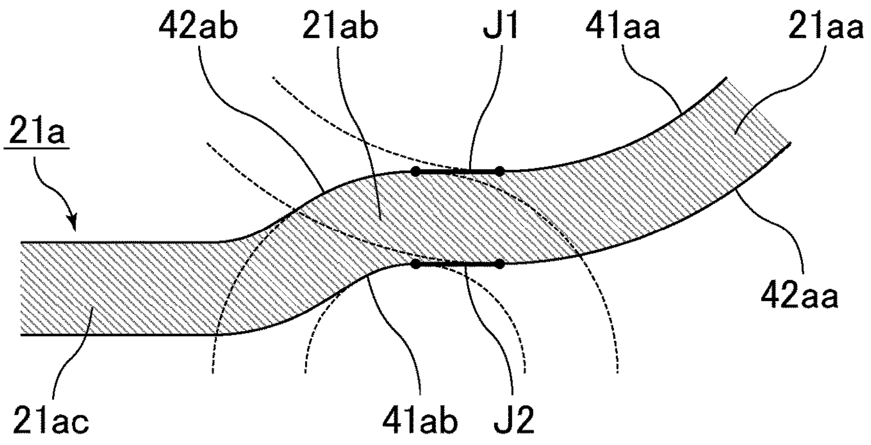
FIG. 4 is a schematic sectional view illustrating an example of an enlarged vicinity of a first coil wire portion and a second coil wire portion in FIG. 3.

FIG. 4 is a schematic sectional view illustrating an example of an enlarged vicinity of the first coil wire portion and the second coil wire portion in FIG. 3.

As illustrated in FIG. 4, the first inner arc 41*aa* may be connected to the second outer arc 42*ab* via a common tangent line J1. Further, as illustrated in FIG. 4, the first outer arc 42*aa* may be connected to the second inner arc 41*ab* via a common tangent line J2.

Since the first inner arc 41*aa* is connected to the second outer arc 42*ab* via the common tangent line J1 and further, the first outer arc 42*aa* is connected to the second inner arc 41*ab* via the common tangent line J2, the first coil wire portion 21*aa* is smoothly connected to the second coil wire portion 21*ab*. Therefore, in the inductor component 1 of the above-described aspect, reflections of the high-frequency signals are easily suppressed. Additionally, in the inductor component 1 of the above-described aspect, the inner diameter of the first coil wire 21*a* tends to become large to readily enhance the efficiency of acquiring inductance.

In this specification, the aspects in which two arcs are interconnected via the common tangential line include the aspect in which two arcs are interconnected via a straight line completely parallel to the tangential direction of both arcs, as well as the in which two arcs are interconnected via a straight line substantially parallel to the tangential direction of both arcs, unless two arcs intersect each other.

Figure 5:
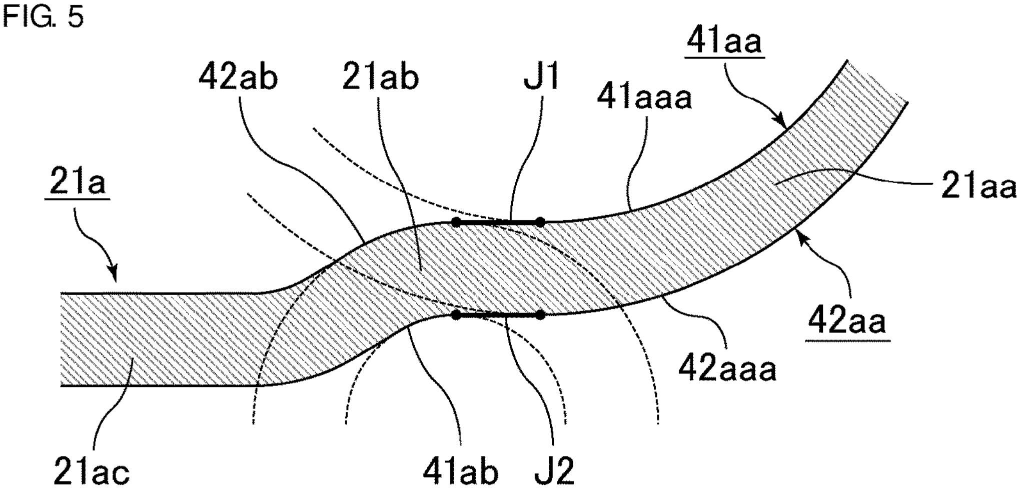
FIG. 5 is a schematic sectional view illustrating another example of the enlarged vicinity of the first coil wire portion and the second coil wire portion in FIG. 3.

FIG. 5 is a schematic sectional view illustrating an example of an enlarged vicinity of the first coil wire portion and the second coil wire portion in FIG. 3.

Both of the first inner arc 41*aa* and the first outer arc 42*aa* may have a plurality of curvature radiuses.

In the case where the first inner arc 41*aa* has a plurality of curvature radiuses, as illustrated in FIG. 5, an arc 41*aaa* having the smallest curvature radius in the first inner arc 41*aa* may be connected to the second outer arc 42*ab* via the common tangent line J1. That is, the arc 41*aaa* having the smallest curvature radius in the first inner arc 41*aa* may be located closest to the second outer arc 42*ab* in the first inner arc 41*aa*, and be connected to the second outer arc 42*ab* via the common tangent line J1 communicating with the second outer arc 42*ab*.

In the case where the first outer arc 42*aa* has a plurality of curvature radiuses, as illustrated in FIG. 5, an arc 42*aaa* having the smallest curvature radius in the first outer arc 42*aa* may be connected to the second inner arc 41*ab* via the common tangent line J2. That is, the arc 42*aaa* having the smallest curvature radius in the first outer arc 42*aa* may be located closest to the second inner arc 41*ab* in the first outer arc 42*aa*, and be connected to the second inner arc 41*ab* via the common tangent line J2 communicating with the second inner arc 41*ab*.

In the case where both of the first inner arc 41*aa* and the first outer arc 42*aa* have a plurality of curvature radius, since the arc 41*aaa* having the smallest curvature radius in the first inner arc 41*aa* is connected to the second outer arc 42*ab* via the common tangent line J1 and further, the arc 42*aaa* having the smallest curvature radius in the first outer arc 42*aa* is connected to the second inner arc 41*ab* via the common tangent line J2, the first coil wire portion 21*aa* is smoothly connected to the second coil wire portion 21*ab*. Therefore, in the inductor component 1 of the above-described aspect, reflections of high-frequency signals are easily suppressed. Moreover, in the inductor component 1 of the above-described aspect, since the inner diameter of the first coil wire 21*a* tends to become large, the efficiency of acquiring inductance can be easily enhanced.

Figure 6:
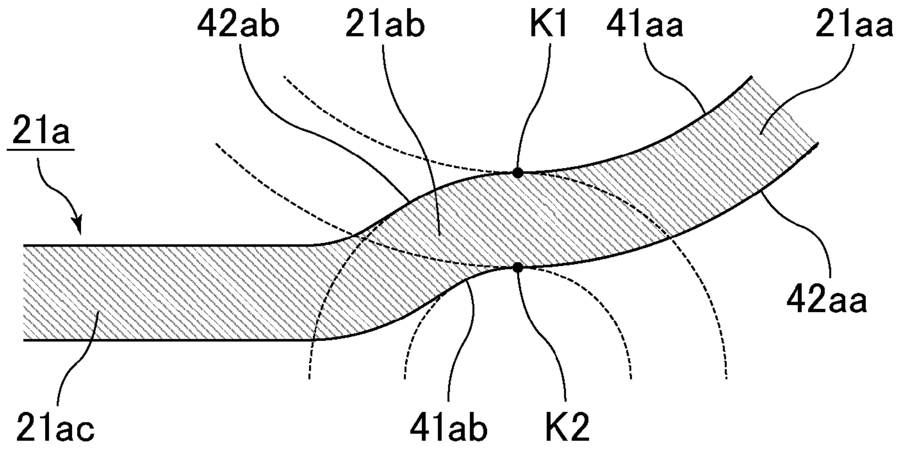
FIG. 6 is a schematic sectional view illustrating still another example of the enlarged vicinity of the first coil wire portion and the second coil wire portion in FIG. 3.

FIG. 6 is a schematic sectional view illustrating still another example of the enlarged vicinity of the first coil wire portion and the second coil wire portion in FIG. 3.

As illustrated in FIG. 6, the first inner arc 41*aa* may be connected to the second outer arc 42*ab* via a common contact point K1. Further, as illustrated in FIG. 6, the first outer arc 42*aa* may be connected to the second inner arc 41*ab* via a common contact point K2.

Since the first inner arc 41*aa* is connected to the second outer arc 42*ab* via the contact point K1 and further, the first outer arc 42*aa* is connected to the second inner arc 41*ab* via the common contact point K2, the first coil wire portion 21*aa* is smoothly connected to the second coil wire portion 21*ab*. Therefore, in the inductor component 1 of the above-described aspect, reflections of high-frequency signals are easily suppressed. Additionally, in the inductor component 1 of the above-described aspect, the inner diameter of the first coil wire 21*a* tends to become large to enhance the efficiency of acquiring inductance.

The curvature radius of the second inner arc 41*ab* is preferably equal to or larger than 10 μm and equal to or smaller than 30 μm (i.e., from 10 μm to 30 μm). The above-mentioned scope of the curvature radius of the second inner arc 41*ab* is especially preferable when the region where the coil wires of the inductor component 1 are disposed is small, for example, when the inductor component 1 has a small size such as 0402 (0.4 mm×0.2 mm×0.2 mm).

Since the curvature radius of the second inner arc 41*ab* is equal to or larger than 10 μm and equal to or smaller than 30 μm (i.e., from 10 μm to 30 μm), the state where the curvature radius of the first inner arc 41*aa* is larger than the curvature radius of the second inner arc 41*ab* can be easily achieved. As a result, in the development during the process of forming the first coil wire portion 21*aa*, developing solution and rinsing solution are easily circulated, such that developing residues and excessive development hardly occur. Further, in the development during the process of forming the second coil wire portion 21*ab*, developing solution and rinsing solution hardly build up, such that developing residues and excessive development hardly occur. Therefore, in the inductor component 1 of the above-described aspect, variations in width when viewed in the coil axis direction of the first coil wire 21*a* are suppressed, thereby suppressing variations in inductance. In addition, in the inductor component 1 of the above-described aspect, since variations in inductance are suppressed, yields indicating the ratio of acquiring an inductor component having normal inductance are enhanced.

It is noted that in the case where the second inner arc 41*ab* has a plurality of curvature radiuses, the maximum value of the curvature radius of the second inner arc 41*ab* is preferably equal to or larger than 10 μm and equal to or smaller than 30 μm (i.e., from 10 μm to 30 μm).

The curvature radius of the second inner arc 41*ab* is preferably equal to or smaller than 10% of the dimension of the element assembly 10 in the height direction T. Since the curvature radius of the second inner arc 41*ab* is equal to or smaller than 10% of the dimension of the element assembly 10 in the height direction T, the state where the curvature radius of the first inner arc 41*aa* is larger than the curvature radius of the second inner arc 41*ab* can be easily achieved. As a result, in the development during the process of forming the first coil wire portion 21*aa*, developing solution and rinsing solution are easily circulated, such that developing residues and excessive development hardly occur. Moreover, in the development during the process of forming the second coil wire portion 21*ab*, developing solution and rinsing solution hardly build up, such that developing residues and excessive development hardly occur. Therefore, in the inductor component 1 of the above-described aspect, variations in width when viewed in the coil axis direction of the first coil wire 21*a* are suppressed, thereby further suppressing variations in inductance. In addition, in the inductor component 1 of the above-described aspect, since variations in inductance are suppressed, yields indicating the ratio of acquiring an inductor component having normal inductance are enhanced.

The curvature radius of the second inner arc 41*ab* is preferably equal to or larger than 5% of the dimension of the element assembly 10 in the height direction T.

Since the curvature radius of the second inner arc 41*ab* is equal to or larger than 5% of the dimension of the element assembly 10 in the height direction T, the second coil wire portion 21*ab* is easily formed.

As described above, the curvature radius of the second inner arc 41*ab* is preferably equal to or larger than 5% and equal to or smaller than 10% (i.e., from 5% to 10%) of the dimension of the element assembly 10 in the height direction T.

Noted that in the case where the second inner arc 41*ab* has a plurality of curvature radiuses, the maximum value of the curvature radius of the second inner arc 41*ab* is preferably equal to or smaller than 10% of the dimension of the element assembly 10 in the height direction T. In addition, in the case where the second inner arc 41*ab* has a plurality of curvature radiuses, the minimum value of the curvature radius of the second inner arc 41*ab* is preferably equal to or larger than 5% of the dimension of the element assembly 10 in the height direction T.

The inner periphery (that is, the second outer arc 42*ab*) of the second coil wire portion 21*ab* is preferably connected to the inner periphery of the third coil wire portion 21*ac* via a fillet.

The outer periphery (that is, the second inner arc 41*ab*) of the second coil wire portion 21*ab* is preferably connected to the outer periphery of the third coil wire portion 21*ac* via a fillet.

The radius of the fillet connecting the inner periphery of the second coil wire portion 21*ab* to the inner periphery of the third coil wire portion 21*ac* and the radius of the fillet connecting the outer periphery of the second coil wire portion 21*ab* to the outer periphery of the third coil wire portion 21*ac* each are preferably equal to or larger than 10 μm. It is noted that the radiuses of the fillets each may be each smaller than 10 μm.

The radius of the fillet connecting the inner periphery of the second coil wire portion 21*ab* to the inner periphery of the third coil wire portion 21*ac* is preferably smaller than the radius of the fillet connecting the outer periphery of the second coil wire portion 21*ab* to the outer periphery of the third coil wire portion 21*ac*. In this case, the radius of the fillet connecting the outer periphery of the second coil wire portion 21*ab* to the outer periphery of the third coil wire portion 21*ac* is preferably a sum of the radius of the fillet connecting the inner periphery of the second coil wire portion 21*ab* to the inner periphery of the third coil wire portion 21*ac* and the width of the first coil wire 21*a*.

In this specification, the fillet refers to a curved portion without any clear corner at the section where arcs or straight lines are interconnected. In addition, the radius of the fillet refers to the curvature radius of a curve constituting the fillet.

As illustrated in FIGS. 2 and 3, the first coil wire 21*a* may further include a fifth coil wire portion 21*ab*' adjacent to the third coil wire portion 21*ac* and a fourth coil wire portion 21*aa*' adjacent to the fifth coil wire portion 21*ab*', in the order from the third coil wire portion 21*ac* toward an end of the first coil wire 21*a* on the opposite side to the first outer electrode 30*a* in the extending direction of the first coil wire 21*a*.

As illustrated in FIGS. 2 and 3, the fifth coil wire portion 21*ab*' extends to be located closer to the top face 12*a* of the element assembly 10 than the third coil wire portion 21*ac*.

As illustrated in FIGS. 2 and 3, when viewed in the coil axis direction, the inner periphery of the fifth coil wire portion 21*ab*' is configured of a fifth outer arc 42*ab*'.

The fifth outer arc 42*ab*' has a center position located outside of the outer periphery of the first coil wire 21*a*, and has at least one curvature radius.

In the example illustrated in FIGS. 2 and 3, the fifth outer arc 42*ab*' has a center position Fb' outside of the outer periphery of the first coil wire 21*a*, and has one curvature radius.

In the example illustrated in FIGS. 2 and 3, the center position Fb' of the fifth outer arc 42*ab*' is located outside of the outer periphery of the first coil wire 21*a* and within the element assembly 10.

As illustrated in FIGS. 2 and 3, when viewed in the coil axis direction, the outer periphery of the fifth coil wire portion 21*ab*' is configured of a fifth inner arc 41*ab*' located closer to the face of the element assembly 10 than the fifth outer arc 42*ab'*.

The fifth inner arc 41*ab*' has a center position outside of the outer periphery of the first coil wire 21*a*, and has at least one curvature radius.

In the example illustrated in FIGS. 2 and 3, the fifth inner arc 4 lab' has a center position Eb' outside of the outer periphery of the first coil wire 21*a*, and has one curvature radius.

In the example illustrated in FIGS. 2 and 3, the center position Eb' of the fifth inner arc 4 lab' is located outside of the outer periphery of the first coil wire 21*a* and within the element assembly 10.

As illustrated in FIGS. 2 and 3, fourth coil wire portion 21*aa*' extends to be located closer to the top face 12*a* of the element assembly 10 than the fifth coil wire portion 21*ab'*.

As illustrated in FIGS. 2 and 3, when viewed in the coil axis direction, the inner periphery of the fourth coil wire portion 21*aa*' is configured of a fourth inner arc 41*aa'*.

The fourth inner arc 41*aa*' has a center position inside of the inner periphery of the first coil wire 21*a*, and has at least one curvature radius.

In the example illustrated in FIGS. 2 and 3, the fourth inner arc 41*aa*' has a center position Ea' inside of the inner periphery of the first coil wire 21*a* and has one curvature radius.

As illustrated in FIGS. 2 and 3, when viewed in the coil axis direction, the outer periphery of the fourth coil wire portion 21*aa*' is configured of a fourth outer arc 42*aa*' located closer to the face of the element assembly 10 than the fourth inner arc 41*aa'*.

The fourth outer arc 42*aa*' has a center position inside of the inner periphery of the first coil wire 21*a*, and has at least one curvature radius.

In the example illustrated in FIGS. 2 and 3, the fourth outer arc 42*aa*' has a center position Fa' inside of the inner periphery of the first coil wire 21*a*, and has one curvature radius.

Thus, as illustrated in FIGS. 2 and 3, the inner periphery of the first coil wire 21*a* further includes the fifth outer arc 42*ab*' and the fourth inner arc 41*aa*' adjacent to the fifth outer arc 42*ab*' on the side of the top face 12*a* of the element assembly 10, in addition to the first inner arc 41*aa* and the second outer arc 42*ab* adjacent to the first inner arc 41*aa* on the side of the bottom face 12*b* of the element assembly 10. Further, as illustrated in FIGS. 2 and 3, the outer periphery of the first coil wire 21*a* further includes the fifth inner arc 41*ab*' and the fourth outer arc 42*aa*' adjacent to the fifth inner arc 41*ab*' on the side of the top face 12*a* of the element assembly 10, in addition to the first outer arc 42*aa* and the second inner arc 41*ab* adjacent to the first outer arc 42*aa* on the side of the bottom face 12*b* of the element assembly 10.

The inner periphery and the of the outer periphery of first coil wire 21*a* have the above-described shape to further suppress reflections of high-frequency signals.

The other aspects of the fourth inner arc 41*aa*', the fourth outer arc 42*aa*', the fifth inner arc 4 lab', and the fifth outer arc 42*ab*' are preferably similar to the respective aspects of the above-described first inner arc 41*aa*, first outer arc 42*aa*, second inner arc 41*ab*, and second outer arc 42*ab*.

The inner periphery of the first extended wire 22*a* is preferably connected to the inner periphery of the first outer electrode 30*a* via a fillet.

The outer periphery of the first extended wire 22*a* is preferably connected to the outer periphery of the first outer electrode 30*a* via a fillet.

The radius of the fillet connecting the inner periphery of the first extended wire 22*a* to the inner periphery of the first outer electrode 30*a* and the radius of the fillet connecting the outer periphery of the first extended wire 22*a* to the outer periphery of the first outer electrode 30*a* are each preferably equal to or larger than 10 μm. It is noted that the radiuses of these fillets each may be smaller than 10 μm.

The radius of the fillet connecting the inner periphery of the first extended wire 22*a* to the inner periphery of the first outer electrode 30*a* is preferably larger than the radius of the fillet connecting the outer periphery of the first extended wire 22*a* to the outer periphery of the first outer electrode 30*a*.

Preferred scopes of various dimensions in FIG. 2 will be described below. The scope of the various dimensions described below is especially preferable when the region where the coil wires of the inductor component 1 are disposed is small, for example, when the inductor component 1 has a small size such as 0402 (0.4 mm×0.2 mm×0.2 mm).

A width M when viewed in the coil axis direction of the first coil wire 21*a* is preferably equal to or larger than 15 μm and equal to or smaller than 40 μm (i.e., from 15 μm to 40 μm).

A shortest distance N1 between the end face 11*a* of the element assembly 10 and the coil 20 (here, the first coil wire 21*a*) in the length direction L is preferably equal to or larger than 20 μm and equal to or smaller than 75 μm (i.e., from 20 μm to 75 μm). A shortest distance N2 between the end face 11*b* of the element assembly 10 and the coil 20 (here, the first coil wire 21*a*) in the length direction L is preferably equal to or larger than 20 μm and equal to or smaller than 75 μm (i.e., from 20 μm to 75 μm).

A shortest distance P1 between the top face 12*a* of the element assembly 10 and the coil 20 (here, the first coil wire 21*a*) in the height direction T is preferably equal to or larger than 10 μm and equal to or smaller than 30 μm (i.e., from 10 μm to 30 μm). A shortest distance P2 between the bottom face 12*b* of the element assembly 10 and the coil 20 (here, first coil wire 21*a*) in the height direction T is preferably equal to or larger than 10 μm and equal to or smaller than 30 μm (i.e., from 10 μm to 30 μm).

A shortest distance Q1 between the coil 20 (here, the first coil wire 21*a*) and the first outer electrode 30*a* in the height direction T is preferably equal to or larger than 10 μm and equal to or smaller than 30 μm (i.e., from 10 μm to 30 μm). A shortest distance Q2 between the coil 20 (here, the first coil wire 21*a*) and the second outer electrode 30*b* in the height direction T is preferably equal to or larger than 10 μm and equal to or smaller than 30 μm (i.e., from 10 μm to 30 μm).

A width R1 of the first outer electrode 30*a* when viewed in the coil axis direction is preferably equal to or larger than 10 μm and equal to or smaller than 25 μm (i.e., from 10 μm to 25 μm). A width R2 of the second outer electrode 30*b* when viewed in the coil axis direction is preferably equal to or larger than 10 μm and equal to or smaller than 25 μm (i.e., from 10 μm to 25 μm).

A dimension Si of the first outer electrode 30*a* exposed to the bottom face 12*b* of the element assembly 10 in the length direction L is preferably equal to or larger than 60 μm and equal to or smaller than 150 μm (i.e., from 60 μm to 150 μm). A dimension S2 of the second outer electrode 30*b* exposed to the bottom face 12*b* of the element assembly 10 in the length direction L is preferably equal to or larger than 60 μm and equal to or smaller than 150 μm (i.e., from 60 μm to 150 μm).

It is preferred that the inductor component 1 has been described mainly in terms of the shape of the first coil wire 21*a* constituting the coil 20, but may be similarly described in terms of the shape of the second coil wire 21*b* constituting the coil 20.

The first coil wire portion 21*aa*, the second coil wire portion 21*ab*, and the third coil wire portion 21*ac*, which are essential constituents of the inductor component 1, only need to be present in at least one coil wire among the plurality of coil wires constituting the coil 20. For example, the first coil wire portion 21*aa*, the second coil wire portion 21*ab*, and the third coil wire portion 21*ac* may be present only in the first coil wire 21*a*, may be present only in the second coil wire 21*b*, may be present in both the first coil wire 21*a* and the second coil wire 21*b*, or may be present in any coil wire other than the first coil wire 21*a* and the second coil wire 21*b*. It is especially preferred that the first coil wire portion 21*aa*, the second coil wire portion 21*ab*, and the third coil wire portion 21*ac* are present in all of the coil wires constituting the coil 20.

The inductor component 1 is manufactured by, for example, a following method.

Steps of Making Mother Multilayer Body

First, for example, by repeatedly applying an insulating paste containing a glass material having borosilicate glass as a main ingredient and the like, for example, by screen printing, an insulating paste layer is formed. The insulating paste layer thus formed will become the insulating layer 15*a*.

Next, for example, by applying a photosensitive conductive paste having Ag or the like as a main metal ingredient by screen printing or the like, a photosensitive conductive paste layer is formed on the insulating paste layer. Further, by irradiating the photosensitive conductive paste layer with ultraviolet rays or the like through a photo mask and then, developing it with alkali solution or the like, a coil conductor layer, an outer conductor layer, and an extended conductor layer connected to the coil conductor layer and the outer conductor layer are formed on the insulating paste layer. In this manner, the coil conductor layer, the extended conductor layer, and the outer conductor layer are formed at multiple areas by photolithography. The coil conductor layers thus formed will become the first coil wire 21*a*. The extended conductor layer thus formed will become the first extended wire 22*a* that connects the first coil wire 21*a* to the first outer electrode 30*a*. The outer conductor layer thus formed will become a portion of each of the first outer electrode 30*a* and the second outer electrode 30*b*.

At formation of the coil conductor layer, for example, by using a photo mask on which a pattern of the coil wire of the inductor component according to the present disclosure (for example, the pattern of the first coil wire 21*a* in FIG. 1) is drawn, the inductor component 1 obtained later can achieve the pattern of the coil wire of the inductor component according to the present disclosure.

It is noted that, when the coil conductor layer, the extended conductor layer, and the outer conductor layer are formed, in place of the exposure using photo mask, for example, DI exposure using no photo mask (also referred as direct image exposure or direct drawing) may be adopted.

Next, for example, by applying a photosensitive insulating paste by screen printing or the like, a new insulating paste layer is formed on the already-formed insulating paste layer. Further, by irradiating the newly formed insulating paste layer with ultraviolet rays or the like through a photo mask and then, developing it with alkali solution or the like, via holes and cavities are formed in the insulating paste layer. In this manner, the insulating paste layer with the via holes and cavities formed at multiple sites are formed by photolithography. The insulating paste layer thus formed include the insulating paste layer that will become the insulating layer 15*b*. The via holes thus formed overlap a portion of the already-formed coil conductor layer. The cavities thus formed overlap the already-formed outer conductor layer.

When the insulating paste layer with via holes and cavities are formed, in place of the exposure using the photo mask, for example, DI exposure using no photo mask may be performed.

Next, for example, by applying a photosensitive conductive paste having Ag or the like as a main metal ingredient by screen printing or the like, a new photosensitive conductive paste layer is formed in the via holes and cavities, and on the already-formed insulating paste layer. Further, by irradiating the photosensitive conductive paste layer with ultraviolet rays or the like through a photo mask and then, developing it with alkali solution or the like, while a connecting conductor layer is formed in the via holes, a new coil conductor layer connected to the connecting conductor layer is formed on the insulating paste layer, and while the new outer conductor layer is formed in the cavities connected to the already-formed outer conductor layer, another new outer conductor layer is formed on the outer conductor layer. In this manner, the coil conductor layer, the connecting conductor layer, and the outer conductor layer are formed by photolithography. The connecting conductor layer thus formed will become a connecting conductor that connects adjacent coil wires in the coil axis direction with each other.

It is noted that when the coil conductor layer, connecting conductor layer, and the outer conductor layer are formed, in place of the exposure using photo mask, for example, DI exposure using no photo mask may be performed.

Subsequently, by repeating the above-described steps, the insulating paste layer, the coil conductor layer, the connecting conductor layer, and the outer conductor layer are formed into a predetermined laminated structure. For example, the coil conductor layer thus formed includes the coil conductor layer that will become the second coil wire 21*b*.

When the coil conductor layer that will become the second coil wire 21*b* and the outer conductor layer that is the same layer of the coil conductor layers are formed, the extended conductor layer connected to the coil conductor layer and the outer conductor layer is also formed. The extended conductor layer thus formed will becomes the second extended wire 22*b*.

Finally, for example, by repeatedly applying an insulating paste containing a glass material having borosilicate glass as a main ingredient by screen printing or the like, a new insulating paste layer is formed. The insulating paste layers thus formed include insulating paste layer that will become the insulating layer 15*c* and the insulating layer 15*d*.

In this manner, the mother multilayer body is made.

The method of forming the conductor patterns of the coil conductor layer, the extended conductor layer, the connecting conductor layer, and the outer conductor layer is not to the above-described photolithography, and for example, may be a method of printing and laminating a conductive paste by use of a screen printing plate with cavities shaped as the conductor pattern, or a method of forming a conductive film by sputtering, evaporation, foil pressing or the like and then, etching the conductor film into the shape of the conductor pattern, or a method of forming a negative pattern by semi-additive process to form a plated film and removing an unnecessary portion of the plated film by etching or the like into the shape of the conductor pattern.

When the conductor patterns of the coil conductor layer, the extended conductor layer, the connecting conductor layer, and the outer conductor layer are formed, a loss caused by resistance at high-frequency can be reduced by forming the conductor patterns in multi-stages to achieve a high aspect ratio. The method of forming the conductor patterns in multi-stages is not specifically limited and for example, may be a method of repeatedly laminating the conductor patterns by repeating the above-mentioned step using photolithography, or a method of repeatedly laminating the conductor patterns formed by the semi-additive process, or a method of laminating the conductor pattern formed by the semi-additive process and the conductor pattern formed by etching a separately-grown plated film in random order, or a method of further growing the plated film formed by the semi-additive process.

The conductive material constituting the conductor patterns of the coil conductor layers, the extended conductor layer, the connecting conductor layer, and the outer conductor layer is not limited to the above-described photosensitive conductive paste having Ag or the like as a main metal ingredient and may be, for example, a conductor containing metal such as Ag, Au, and Cu, which is formed by sputtering, evaporation, foil pressing, plating or the like.

The method of forming the insulating paste layer is not limited to the above-described photolithography and may be, for example, a method of pressing a sheet made of an insulating material, or a method of spin-coating an insulating material, or a method of spray-coating an insulating material.

The method of forming the insulating paste layer having via holes and cavities is not limited to the above-described photolithography and for example, the via holes and cavities may be provided by forming an insulating film by pressing of a sheet made of an insulating material, spin-coating of an insulating material, spray-coating of an insulating material, or the like and applying laser machining, drill machining, or the like to the insulating film.

Insulating materials constituting the insulating paste layer is not limited to a glass material having borosilicate glass as a main ingredient. Insulating materials constituting the insulating paste layer may be, for example, ceramics materials, epoxy resins, fluororesins, organic materials such as polymeric resins, and composite materials such as glass epoxy resins. Materials having small permittivity and dielectric loss are preferable as the insulating materials.

Steps of Forming Element Assembly, Coil, and Outer Electrodes

First, a mother multilayer body is cut using a dicing saw or the like into a plurality of individual unfired multilayer bodies.

The unfired multilayer body includes an insulating paste laminated portion formed by laminating the insulating paste layers, a coil conductor laminated portion formed by laminating the coil conductor layers such that adjacent coil conductor layers are electrically connected to each other via the connecting conductor layer, and an outer conductor laminated portion formed by laminating the outer conductor layers.

When the unfired multilayer body is individualized, the outer conductor laminated portion is exposed at two areas on at least a bottom face of the insulating paste laminated portion included in a cut face of the unfired multilayer body.

Next, the multilayer body is made by firing the unfired multilayer body.

When the unfired multilayer body is fired, the insulating paste layers become the insulating layers and the insulating paste laminated portion becomes the element assembly 10. In addition, when the unfired multilayer body is fired, the coil conductor layers become the coil wires and the coil conductor laminated portion becomes the coil 20. Further, when the unfired multilayer body is fired, one of the two outer conductor laminated portions becomes a portion of the first outer electrode 30*a*, and the other becomes a portion of the second outer electrode 30*b*.

Next, by applying, for example, barrel finishing to the obtained multilayer body, corners and ridges of the element assembly 10 may be rounded.

Finally, using the two fired outer conductor laminated portions as base electrodes, an Ni-plated electrode and an Sn-plated electrode are serially formed on the face of each of the base electrodes by plating. For example, the thicknesses of the Ni-plated electrode and the Sn-plated electrode each are equal to or larger than 2 μm and equal to or smaller than 10 μm (i.e., from 2 μm to 10 μm).

In this manner, the first outer electrode 30*a* and the second outer electrode 30*b* having the base electrode, the Ni-plated electrode, and the Sn-plated electrode in the order from the side of the face of the element assembly 10 are formed.

The method of forming the outer electrode is not limited to the above-described method of applying plating to the outer conductor laminated portion exposed to the cut face of the unfired multilayer body (at least the bottom face of the insulating paste laminated portion) and, described above, may be, for example, a method of allowing the outer conductor laminated portion to be exposed to the cut face of the unfired multilayer body (at least the bottom face of the insulating paste laminated portion) and immersing (dipping) the exposed portion of the outer conductor laminated portion in a conductive paste or forming a conductive paste film on the exposed portion of the outer conductor laminated portion by sputtering and then, applying plating.

In this manner, the inductor component 1 is manufactured.

The inductor component 1 is manufactured to have, for example, 0402 (0.4 mm×0.2 mm×0.2 mm) size. The size of the inductor component 1 is not limited to the 0402 (0.4 mm×0.2 mm×0.2 mm) size.

As described above, for example, photo mask (for example, in the case of exposure by photolithography), design drawing (in the case of DI exposure) and the like can be considered as molds used to form the coil conductor layers (that will become the coil wires). In the case where the pattern of the coil wires of the inductor component according to the present disclosure (for example, pattern of the first coil wire 21*a* in FIG. 1) is drawn on the molds, the pattern of the coil wires of the inductor component according to the present disclosure can be achieved. For this reason, the molds (for example, photo mask, design drawing, etc.) on which the pattern of the coil wires of the inductor component according to the present disclosure is drawn also belong to the present disclosure.

This specification discloses following contents.

<1> An inductor component including: an element assembly; a coil provided within the element assembly, the coil being spirally wound in a coil axis direction; a first outer electrode electrically connected to one end of the coil; and a second outer electrode electrically connected to the other end of the coil. The element assembly includes an insulator, a face of the element assembly includes a bottom face parallel to the coil axis direction and a top face opposed to the bottom face in a height direction orthogonal to the coil axis direction. The first outer electrode and the second outer electrode each are exposed to at least the bottom face of the element assembly. The coil is formed by electrically interconnecting a plurality of coil wires laminated in the coil axis direction. At least one of the coil wires includes, in a direction in which the coil wire extends, a first coil wire portion, a second coil wire portion adjacent to the first coil wire portion, and a third coil wire portion adjacent to the second coil wire portion. The first coil wire portion extends from the top face of the element assembly toward the bottom face. When viewed in the coil axis direction, an inner periphery of the first coil wire portion is configured of a first inner arc. The first inner arc has a center position inside of an inner periphery of the coil wire and has at least one curvature radius. When viewed in the coil axis direction, an outer periphery of the first coil wire portion is configured of a first outer arc located closer to the face of the element assembly than the first inner arc. The first outer arc has a center position inside of the inner periphery of the coil wire and has at least one curvature radius. The second coil wire portion extends to be located closer to the bottom face of the element assembly than the first coil wire portion, when viewed in the coil axis direction. An inner periphery of the second coil wire portion is configured of a second outer arc. The second outer arc has a center position outside of an outer periphery of the coil wire and has at least one curvature radius. When viewed in the coil axis direction, an outer periphery of the second coil wire portion is configured of a second inner arc located closer to the face of the element assembly than the second outer arc. The second inner arc has a center position outside of the outer periphery of the coil wire and has at least one curvature radius, and the third coil wire portion protrudes from the second coil wire portion toward the bottom face of the element assembly.

<2> The inductor component according to <1>, in which the curvature radius of the first inner arc is larger than the curvature radius of the second inner arc.

<3> The inductor component according to <2>, in which both of the center position of the first inner arc and the center position of the first outer arc are present to be closer than the top face of the element assembly than a center position of the element assembly in the height direction.

<4> The inductor component according to <3>, in which the curvature radius of the first inner arc is equal to or larger than 15% of a dimension of the element assembly in the height direction.

<5> The inductor component according to <3> or <4>, in which the curvature radius of the first inner arc is equal to or larger than 30

<6> The inductor component according to any one of <2> to <5>, in which the first inner arc is connected to the second outer arc via a common tangential line, and the first outer arc is connected to the second inner arc via a common tangential line.

<7> The inductor component according to <6>, in which both of the first inner arc and the first outer arc have a plurality of curvature radiuses, an arc having a smallest curvature radius in the first inner arc is connected to the second outer arc via a common tangential line, and an arc having a smallest curvature radius in the first outer arc is connected to the second inner arc via a common tangential line.

<8> The inductor component according to any one of <2> to <5>, in which the first inner arc is connected to the second outer arc via a common contact point, and the first outer arc is connected to the second inner arc via a common contact point.

<9> The inductor component according to any one of <6> to <8>, in which the curvature radius of the second inner arc is equal to or larger than 10 μm and equal to or smaller than 30 μm (i.e., from 10 μm to 30 μm).

<10> The inductor component according to any one of <6> to <9>, in which the curvature radius of the second inner arc is equal to or smaller than 10% of a dimension of the element assembly in the height direction.

What is claimed is:

1. An inductor component comprising:

an element assembly;

a coil within the element assembly, the coil being spirally wound in a coil axis direction;

a first outer electrode electrically connected to one end of the coil; and a second outer electrode electrically connected to an other end of the coil, wherein, the element assembly includes an insulator, a face of the element assembly includes a bottom face parallel to the coil axis direction and a top face opposed to the bottom face in a height direction orthogonal to the coil axis direction, the first outer electrode and the second outer electrode each are exposed to at least the bottom face of the element assembly, the coil includes a plurality of electrically interconnected coil wires laminated in the coil axis direction, at least one of the coil wires includes, in a direction in which the at least one of the coil wires extends, a first coil wire portion, a second coil wire portion adjacent to the first coil wire portion, and a third coil wire portion adjacent to the second coil wire portion, the first coil wire portion extends from the top face of the element assembly toward the bottom face, when viewed in the coil axis direction, an inner periphery of the first coil wire portion is configured of a first inner arc, the first inner arc has a center position inside of an inner periphery of the at least one of the coil wires and has at least one curvature radius, when viewed in the coil axis direction, an outer periphery of the first coil wire portion is configured of a first outer arc located closer to the face of the element assembly than the first inner arc, the first outer arc has a center position inside of the inner periphery of the at least one of the coil wires and has at least one curvature radius, the second coil wire portion extends closer to the bottom face of the element assembly than the first coil wire portion, when viewed in the coil axis direction, an inner periphery of the second coil wire portion is configured of a second outer arc, the second outer arc has a center position outside of an outer periphery of the at least one of the coil wires and has at least one curvature radius, when viewed in the coil axis direction, an outer periphery of the second coil wire portion is configured of a second inner arc closer to the face of the element assembly than the second outer arc, the second inner arc has a center position outside of the outer periphery of the at least one of the coil wires and has at least one curvature radius, and the third coil wire portion protrudes from the second coil wire portion toward the bottom face of the element assembly.

2. The inductor component according to claim 1, wherein the curvature radius of the first inner arc is larger than the curvature radius of the second inner arc.

3. The inductor component according to claim 2, wherein both of the center position of the first inner arc and the center position of the first outer arc are closer than the top face of the element assembly than a center position of the element assembly in the height direction.

4. The inductor component according to claim 3, wherein the curvature radius of the first inner arc is equal to or larger than 15% of a dimension of the element assembly in the height direction.

5. The inductor component according to claim 3, wherein the curvature radius of the first inner arc is equal to or larger than 30 μm.

6. The inductor component according to claim 2, wherein the first inner arc is connected to the second outer arc via a common tangential line, and the first outer arc is connected to the second inner arc via a common tangential line.

7. The inductor component according to claim 6, wherein both of the first inner arc and the first outer arc have a plurality of curvature radiuses, an arc having a smallest curvature radius in the first inner arc is connected to the second outer arc via a common tangential line, and an arc having a smallest curvature radius in the first outer arc is connected to the second inner arc via a common tangential line.

8. The inductor component according to claim 2, wherein the first inner arc is connected to the second outer arc via a common contact point, and the first outer arc is connected to the second inner arc via a common contact point.

9. The inductor component according to claim 6, wherein the curvature radius of the second inner arc is from 10 μm to 30 μm.

10. The inductor component according to claim 6, wherein the curvature radius of the second inner arc is equal to or smaller than 10% of a dimension of the element assembly in the height direction.

11. The inductor component according to claim 7, wherein the curvature radius of the second inner arc is from 10 μm to 30 μm.

12. The inductor component according to claim 8, wherein the curvature radius of the second inner arc is from 10 μm to 30 μm.

13. The inductor component according to claim 7, wherein the curvature radius of the second inner arc is equal to or smaller than 10% of a dimension of the element assembly in the height direction.

14. The inductor component according to claim 8, wherein the curvature radius of the second inner arc is equal to or smaller than 10% of a dimension of the element assembly in the height direction.

* * * * *